US009267815B2

(12) United States Patent
Kuroiwa

(10) Patent No.: US 9,267,815 B2
(45) Date of Patent: Feb. 23, 2016

(54) REMOTE MONITORING SYSTEM, DATA COLLECTING DEVICE AND MONITORING DEVICE

(75) Inventor: Takeru Kuroiwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 14/342,844

(22) PCT Filed: Sep. 22, 2011

(86) PCT No.: PCT/JP2011/071647
§ 371 (c)(1),
(2), (4) Date: Mar. 5, 2014

(87) PCT Pub. No.: WO2013/042246
PCT Pub. Date: Mar. 28, 2013

(65) Prior Publication Data
US 2014/0225743 A1  Aug. 14, 2014

(51) Int. Cl.
*G08C 19/16* (2006.01)
*G05B 23/02* (2006.01)
(Continued)

(52) U.S. Cl.
CPC ............ *G01D 4/002* (2013.01); *H04L 12/2825* (2013.01); *H04Q 9/00* (2013.01); *H04L 63/102* (2013.01); *H04L 63/105* (2013.01)

(58) Field of Classification Search
CPC ..... G01W 1/08; B60R 16/0315; B60R 25/04; B61L 7/088; G08C 17/02; G08B 3/10; F24F 11/0086; B29C 45/76
USPC .......... 340/3.9, 3.42, 3.43, 540, 5.1; 700/276, 700/204
See application file for complete search history.

(56) References Cited

U.S. PATENT DOCUMENTS 6,385,510 B1 * 5/2002 Hoog .................. F24F 11/0086
                                                           379/102.05
7,444,401 B1   10/2008 Keyghobad et al.
(Continued)

FOREIGN PATENT DOCUMENTS

EP     2 264 374 A1    12/2010
EP     2 365 664 A1     9/2011
(Continued)

OTHER PUBLICATIONS

Office Action mailed Jun. 2, 2015 in the corresponding JP application No. 2013-534546 (English translation attached).
(Continued)

*Primary Examiner* — George Bugg
*Assistant Examiner* — Munear Akki
(74) *Attorney, Agent, or Firm* — Posz Law Group, PLC; David Posz

(57) ABSTRACT

A data collecting device collects operation data of facility equipment that constitute a facility device control system. Upon receiving a collection data request command from a monitoring device, the data collecting device reads one or multiple items of operation data of the type specified by the collection data request command from among multiple items of collected operation data, and sends to the monitoring device response data wherein the read data is stored in a prescribed format. When a user inputs an operation that requests monitoring of operation data, the monitoring device has the user select a desired operation data type from among the operation data types that can be disclosed to the user, and sends to the data collecting device a collection data request command wherein the selected operation data type is specified. Upon receiving the response data from the data collecting device, the monitoring device displays, in the prescribed format, one or multiple items of operation data included in the response data.

8 Claims, 9 Drawing Sheets

(51) Int. Cl.
*G09B 21/00* (2006.01)
*G05B 19/00* (2006.01)
*G05B 21/00* (2006.01)
*G01D 4/00* (2006.01)
*H04L 12/28* (2006.01)
*H04Q 9/00* (2006.01)
*H04L 29/06* (2006.01)

(56) References Cited

U.S. PATENT DOCUMENTS

| | | | | |
|---|---|---|---|---|
| 7,610,116 | B2* | 10/2009 | Masui | F24F 11/0086 340/12.32 |
| 8,498,748 | B2* | 7/2013 | Murai | F24F 11/0086 340/506 |
| 2001/0048376 | A1* | 12/2001 | Maeda | F24F 11/0086 340/870.17 |
| 2002/0029096 | A1 | 3/2002 | Takai et al. | |
| 2003/0140637 | A1* | 7/2003 | Masui | F24F 11/006 62/127 |
| 2009/0009282 | A1* | 1/2009 | Wang | H05B 37/0245 340/3.1 |
| 2010/0127881 | A1* | 5/2010 | Schechter | H05K 7/20836 340/584 |
| 2010/0325270 | A1* | 12/2010 | Ishizaka | F24F 11/0086 709/224 |

FOREIGN PATENT DOCUMENTS

| | | |
|---|---|---|
| JP | 2001-177657 A | 6/2001 |
| JP | 3731120 B2 | 10/2005 |
| JP | 2006-217550 A | 8/2006 |
| JP | 2006-287443 A | 10/2006 |
| JP | 2009-134699 A | 6/2009 |
| JP | 2010-199916 A | 9/2010 |
| JP | 2010-273123 A | 12/2010 |
| WO | 01-35190 A2 | 5/2001 |

OTHER PUBLICATIONS

International Search Report mailed Nov. 1, 2011 for the corresponding international application No. PCT/JP2011/071647 (with English translation).

Extended European Search Report dated Apr. 13, 2015 issued in corresponding EP patent application No. 11872759.3.

* cited by examiner

| EQUIPMENT ADDRESS | TYPE ID | ACQUISITION TIME | DATA VALUE |
|---|---|---|---|
| 50h (OUTDOOR EQUIPMENT) | a01 (REFRIGERANT TEMPERATURE) | 2011/08/23 12:00 | 78(deg C) |
| 51h (INDOOR EQUIPMENT A) | a05 (OPERATION MODE) | 2011/08/23 12:00 | 1 (COOLING) |
| 52h (INDOOR EQUIPMENT B) | a03 (SET TEMPERATURE) | 2011/08/23 12:00 | 27(deg C) |
| ⋮ | ⋮ | ⋮ | ⋮ |

FIG.5

| TYPE ID | PASSWORD | CONNECTABLE RANGE | DISCLOSABLE RANGE |
|---|---|---|---|
| b01 (ENGINEER) | XXXXXXX | c01 – c04 | a01 (REFRIGERANT TEMPERATURE), a02 (REFRIGERANT PRESSURE), a03 (OUTDOOR TEMPERATURE), a04 (SET TEMPERATURE), a05 (INDOOR TEMPERATURE), a06 (OPERATION MODE), a07 (VALVE OPENNESS) |
| b02 (BUILDING MANAGER A) | XXXXXXX | c01, c02 | a04 – a06 |
| b03 (BUILDING MANAGER B) | XXXXXXX | c03, c04 | a04 – a06 |
| ⋮ | ⋮ | ⋮ | ⋮ |

FIG.8

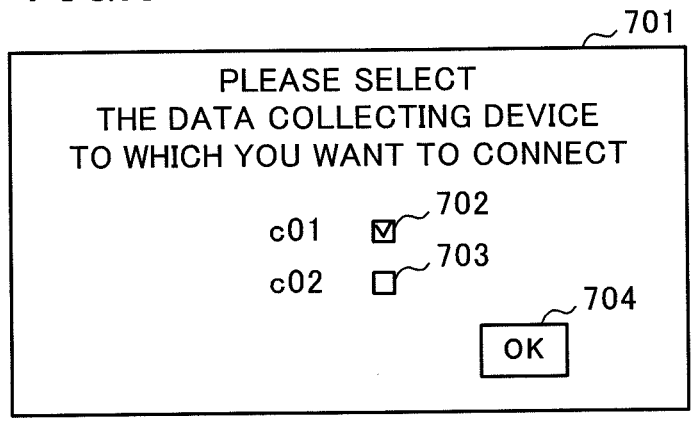

PLEASE SELECT
THE DATA COLLECTING DEVICE
TO WHICH YOU WANT TO CONNECT c01 ☑ ~702
c02 ☐ ~703
                    ~704
          [OK]

FIG.9

SUMMARY DATA

| EQUIPMENT ADDRESS | TYPE ID |
|---|---|
| 50h (OUTDOOR EQUIPMENT) | a01 (REFRIGERANT TEMPERATURE), a02 (REFRIGERANT PRESSURE), a03 (OUTDOOR TEMPERATURE), a07 (VALVE OPENNESS) |
| 51h (INDOOR EQUIPMENT A) | a04 – a06 |
| 52h (INDOOR EQUIPMENT B) | a04 – a06 |

FIG.10

OPERATION DATA ACQUISITION CANDIDATES

| EQUIPMENT ADDRESS | TYPE ID |
|---|---|
| 51h (INDOOR EQUIPMENT A) | a04 (SET TEMPERATURE), a05 (INDOOR TEMPERATURE), a06 (OPERATION MODE) |
| 52h (INDOOR EQUIPMENT B) | a04 (SET TEMPERATURE), a05 (INDOOR TEMPERATURE), a06 (OPERATION MODE) |

FIG.11

PLEASE SELECT THE OPERATION DATA
YOU WANT TO ACQUIRE

FACILITY EQUIPMENT     OPERATION DATA TYPE

51h ☐ 1102     a04 ☐ 1104   a05 ☐ 1105   a06 ☐ 1106

52h ☐ 1103     a04 ☐ 1107   a05 ☐ 1108   a06 ☐ 1109

PERIOD   STARTING DATE/TIME [     ] 1110 — ENDING DATE/TIME [     ] 1111

PLEASE SELECT THE OPERATION DATA
YOU WANT TO ACQUIRE

FACILITY EQUIPMENT     OPERATION DATA TYPE

51h ☑ 1102     a04 ☑ 1104   a05 ☑ 1105   a06 ☑ 1106

52h ☐ 1103     a04 ☐ 1107   a05 ☐ 1108   a06 ☐ 1109

PERIOD   STARTING DATE/TIME [2011/08/23/12:00] 1110 — ENDING DATE/TIME [2011/08/23/17:00] 1111

[ OK ] 1112

REMOTE MONITORING SYSTEM, DATA COLLECTING DEVICE AND MONITORING DEVICE

CROSS REFERENCE TO REALATED APPLICATION

This application is a U.S. national stage application of International Application No. PCT/JP2011/071647 filed on Sep. 22, 2011.

TECHNICAL FIELD

The present invention relates to a remote monitoring system, a data collecting device and a monitoring device for remotely implementing monitoring of operating statuses of various types of facility equipment such as air conditioning equipment, lighting equipment and/or the like constituting a facility equipment control system.

BACKGROUND ART

A data collecting device for collecting data (hereafter referred to as operation data) indicating the operating status of various facility equipment in a so-called facility equipment control system installed in a building and/or the like has been known from before.

In the above-described case, an operator accomplishing work such as maintenance and/or the like on the facility equipment control system must periodically go to the location (for example, a prescribed location inside a building in which the facility equipment control system is installed) where the data collecting device is located in order to do work. That is to say, it is necessary for the operator to accomplish work such as confirming at that location operation data collected by the data collecting device or storing such data on a mobile information terminal and/or the like for purposes of detailed analysis. Consequently, this work is extremely labor intensive.

Hence, various technologies have been proposed for monitoring operation data remotely so operation data can be swiftly confirmed without the operator needing to go to the location.

For example, Patent Literature 1 proposes a data collecting device for collecting operation data in accordance with collection items by storing and interpreting item definition files defining collection items for operation data.

In addition, Patent Literature 2 proposes a facility equipment control system comprising a station for compressing and transmitting operation data related to air conditioning equipment, and a management device connected to the station, for receiving operation data.

CITATION LIST

Patent Literature

Patent Literature 1: Unexamined Japanese Patent Application Kokai Publication No. 2009-134699.
Patent Literature 2: Japanese Patent Publication 3731120.

SUMMARY OF INVENTION

Technical Problem

However, the data collecting device of Patent Literature 1, despite being equipped with a function for defining operation data to be collected, periodically transmits collected operation data without classifying the data. Consequently, depending on the volume of operation data that is subject to collection, there is a possibility that the communication volume could become extremely large.

In addition, in the facility equipment control system of Patent Literature 2, although communication volume can be reduced by compressing operation data, the composition continues to transmit operation data in real time, so the station and the managing device must be continuously connected. Consequently, when a communication service that uses a pay-as-you-go fee structure must be used for communication between the station and the managing device, the problem arises the communication fees become extremely high.

However, in the work of monitoring operation data, an engineer who accomplishes maintenance of the facility equipment control system, a manager of the building where the facility equipment control system is installed, and/or the like, are envisioned as users. In general, the range in which the operation data can be assertively disclosed differs depending on differences among such users. For example, to an engineer consigned from the original providing (sale) of the facility equipment control system, it may be fine to disclose all types of operation data without being particularly bound by the range, but with a building manager, there may be cases in which only a portion of basic operation data such as set temperatures, room temperatures and/or the like are disclosed from the perspective of preserving confidentiality. However, on this point, no effective technology proposal has yet been made.

In consideration of the foregoing, it is an objective of the present invention to provide a remote monitoring system that is able to reduce the communication load while also strengthening confidentiality and/or the like in remote monitoring of operation data from facility equipment constituting a facility equipment control system.

Solution to Problem

In order to achieve the above objective, the remote monitoring system according to the present invention comprises a data collecting device and a monitoring device, wherein:
the data collecting device comprises:
an equipment communicator that accomplishes data communication with facility equipment that constitutes a facility equipment control system;
a first remote communicator that accomplishes data communication with the monitoring device;
an operation data collector that collects operation data indicating the operation status of the facility equipment;
an operation data storage that stores the operation data collected by the operation data collector; and
an operation data transmitter that, upon receiving a collection data request command transmitted from the monitoring device requesting transmission of collected operation data, reads from the operation data storage one or multiple items of operation data of a type designated by the collection data request command and transmits response data storing the one or multiple items of operation data that were read in a prescribed format to the monitoring device via the first remote communicator; and
the monitoring device comprises:
a second remote communicator that accomplishes data communication with the data collecting device;
an operation receiver that receives operation input from a user;

a user data storage that stores a user data table in which types of operation data disclosable to each user are defined;

an operation data requestor that, when operation input requesting monitoring of operation data is accomplished by a user, causes a desired type of operation data to be selected by the user from among types of operation data disclosable to the user, generates a collection data request command designating at least the type of operation data selected by the user, and transmits the generated collection data request command to the data collecting device via the second remote communicator; and an operation data display that, upon receiving the response data transmitted from the data collecting device, causes one or multiple items of operation data included in the response data to be displayed in a prescribed format on a display device.

Advantageous Effects of Invention

With the present invention, in remotely monitoring operation data from facility equipment constituting a facility equipment control system, the disclosure range of operation data is limited in accordance with the type of user such as an operator, and moreover, only operation data selected by a user is transmitted to the monitoring device from the data collecting device. Accordingly, it is possible to reduce the communications load while also maintaining confidentiality and preventing erroneous operation.

BRIEF DESCRIPTION OF DRAWINGS

FIG. 5 is a drawing showing an example of a user data table;

FIG. 8 is a drawing showing an input example in the connection target selection screen;

FIG. 9 is a drawing showing an example of summary data;

FIG. 10 is a drawing for explaining operation data acquisition candidates;

FIG. 11 is a drawing showing an example of an operation data selection screen;

FIG. 12 is a drawing showing an input example in the operation data selection screen;

DESCRIPTION OF EMBODIMENTS

Below, a facility equipment control system according to an embodiment of the present invention is described in detail with reference to the drawings.

Figure 1:
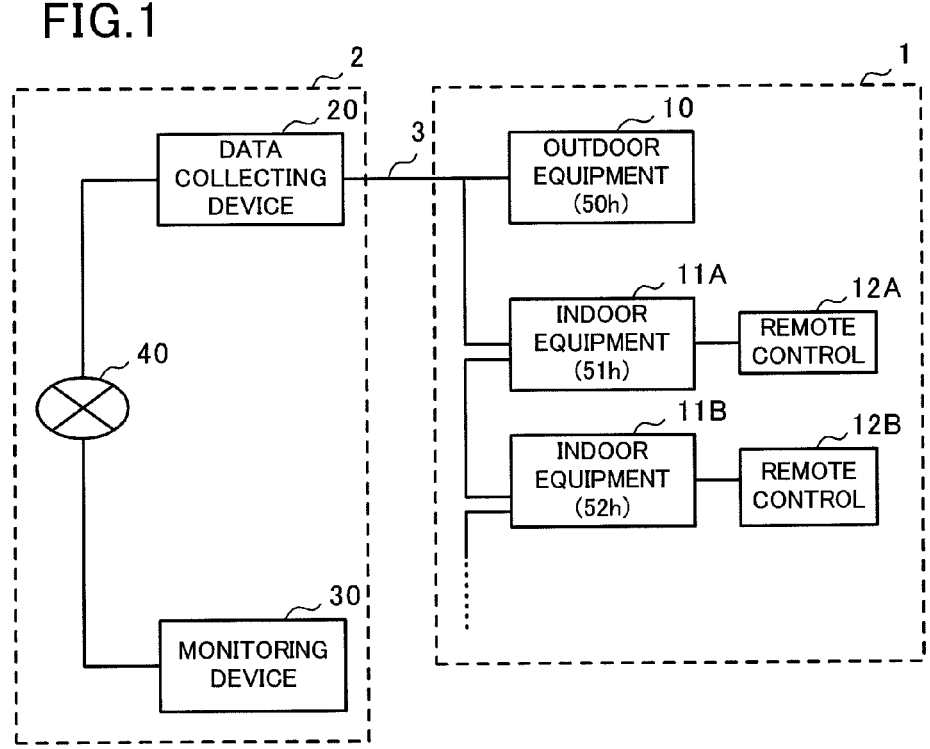
FIG. 1 is a is a drawing showing a configuration of a remote monitoring system according to an embodiment of the present invention and a facility equipment control system connected to the remote monitoring system.

FIG. 1 is a drawing showing a configuration of a remote monitoring system 2 according to an embodiment of the present invention and a facility equipment control system 1 connected to the remote monitoring system 2.

The facility equipment control system 1 is installed in an office building, for example, and comprises outdoor equipment 10, multiple pieces of indoor equipment 11 (11A, 11B, . . . ) and multiple remote controls 12 (12A, 12B, . . . ). The outdoor equipment 11 and the various pieces of indoor equipment 12 are connected via a communication line 3 so as to be capable of mutual communication. In addition, the outdoor equipment 10 and the various pieces of indoor equipment 11 are connected by refrigerant piping for circulating a refrigerant, although this is not depicted in the drawings.

The indoor equipment 11 operates based on operation signals from the corresponding remote control 12. Specifically, the indoor equipment 11 switches operating modes among cooling, heating, dehumidifying and ventilation and/or the like in accordance with the corresponding operation signal, and accomplishes actions for blowing air at a set temperature with a set air volume. In addition, the indoor equipment 11 sends data (status change data) indicating the operating status that has changed based on the operation signal from the remote control 12 to the outdoor equipment 10. Furthermore, the indoor equipment 11, upon receiving a command requesting operation data (operation data request command) from below-described data collecting device 20 of the remote monitoring system 2, sends data (operation data) indicating the current operating status to the data collecting device 20.

The remote control 12 is a remote controller for causing the indoor equipment 11 to operate under set conditions desired by the user. The remote control 12 may comprise one unit for each piece of indoor equipment 11, as in this example, or may comprise a single remote control 12 corresponding to multiple pieces of indoor equipment 11.

The outdoor equipment 10, upon receiving the status change data from the indoor equipment 11, adjusts the operating status of the various constituent components (compressor, condenser, expansion valve, evaporator, and/or the like) so that the indoor equipment 11 operates under the operating status indicated by the status change data. In addition, when the operation data request command is received from the data collecting device 20, the outdoor equipment 10 sends the current operation data of the outdoor equipment 10 to the data collecting device 20.

Information (equipment addresses) for identifying the various pieces of facility equipment are assigned to the above-described outdoor equipment 10 and each piece of indoor equipment 11 as shown in FIG. 1.

The remote monitoring system 2 comprises data collecting devices 20 and a monitoring device 30. The data collecting devices 20 and the monitoring device 30 are connected so as to be capable of data communication, via a prescribed network 40. In addition, each of the data collecting devices 20 and the various pieces of facility equipment (outdoor equipment 10, indoor equipment 11A, 11B, . . . ) of the facility equipment control system 1 are connected so as to be capable of data communication, via the communication line 3.

The network 40 may be a wide-area network such as the Internet and/or the like or may be a LAN (Local Area Network) and/or the like. In addition, a wired or a wireless method may be adopted for communication between the data collecting devices 20 and the monitoring device 30.

Although not depicted in the drawings, multiple data collecting devices 20 are connected to the network 40. Furthermore, each data collecting device 20 is respectively connected to a different facility equipment control system 1 and collects operation data from the corresponding facility equipment control system 1.

Figures 2, 3:
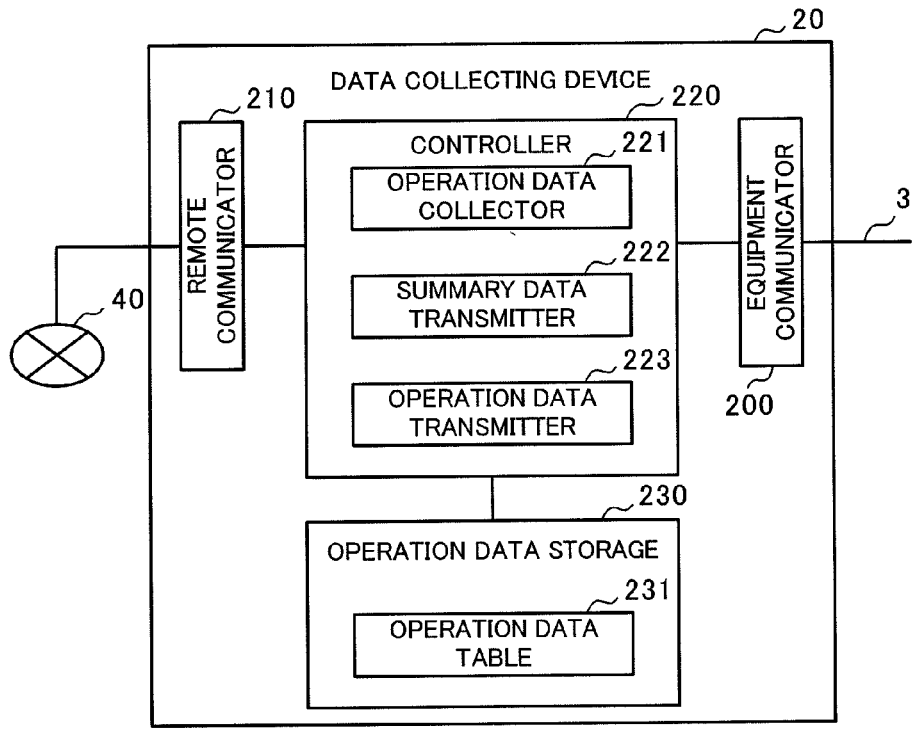
FIG. 2 is a block diagram showing a configuration of a data collecting device.
FIG. 3 is a drawing showing an example of an operation data table.

The data collecting device 20 is a device for collecting operation data for each piece of facility equipment from the facility equipment control system 1. As shown in FIG. 2, the data collecting device 20 comprises an equipment communicator 200, a remote communicator 210, a controller 220 and an operation data storage 230.

The equipment communicator 200 comprises, for example, a communication interface such as a network card and/or the like, and accomplishes data communication with each piece of facility equipment of the facility equipment control system 1 via the communication line 3. The equipment communicator 200, for example, sends the above-described operation data request command to the designated facility equipment based on instructions from the controller 220. In addition, the equipment communicator 200 receives operation data sent from the facility equipment. It would be fine for data communication between the equipment communicator 200 and each piece of facility equipment in the facility equipment control system 1 to be accomplished by a prescribed wireless method.

The remote communicator 210 (first remote communicator) comprises, for example, a communication interface such as a network card, a data communication card and/or the like, and accomplishes data communication with the below-described monitoring device 30 via the network 40.

The controller 220 comprises a CPU (Central Processing Unit), a ROM (Read Only Memory), a RAM (Random Access Memory) and/or the like, although such is not depicted in the drawings. The controller 220 collects operation data from the equipment control system 1. In addition, the controller 220 sends collected operation data and other stored data to the monitoring device 30 via the remote communicator 210 in response to requests from the monitoring device 30. The controller 220 functionally comprises an operation data collector 221, a summary data transmitter 222 and an operation data transmitter 223. Details of each of these functional components are described below.

The operation data storage 230 comprises, for example, readable and writable non-volatile semiconductor memory or a hard disk drive and/or the like, and stores operation data collected from the equipment control system 1 in a prescribed format. In this embodiment, the collected operation data is stored in an operation data table 231.

The operation data table 231 is a data table with multiple entries of records comprising an equipment address 2310, a type ID 2311, acquisition time 2312 and a data value 2313, as shown in FIG. 3.

The equipment address 2310 is information for identifying each piece of facility equipment in the facility equipment control system 1, as described above. In this embodiment, "50h" is assigned to the outdoor equipment 10, and "51h" and "52h" are assigned to the indoor equipment 11A and 11B, respectively, as shown in FIGS. 1 and 3.

The type ID 2311 is an ID indicating the type of operation data in the facility equipment, for example, refrigerant temperature, set temperature or operation mode and/or the like. In this embodiment, the refrigerant temperature is indicated by "a01", the set temperature by "a04" and the operation mode by "a06". The acquisition time 2312 is data indicating the date and time the operation data was acquired from the facility equipment control system 1.

The data value 2313 is the value of the operation data indicated by the type ID 2311. When the type ID 2311 indicates operation mode, for example, the data value 2313 is indicated by a predetermined value in accordance with the type of operation mode, such as 0 for stop, 1 for cooling, 2 for heating, 3 for ventilation and 4 for dehumidifying, and/or the like. In addition, when the type ID 2311 indicates the refrigerant temperature or the set temperature and/or the like, the data value indicates the value of the temperature (units: ° C.).

The composition of the above-described operation data table 231 is not limited. For example, the table may be realized through a hash table function commonly implemented in programming languages. Or, the operation data storage 230 may store a table in which the respective values of the equipment address 2310, the type ID 2311 and the acquisition time 2312 are associated with an arrangement index, and the data value 2313 may be stored as a three-dimensional arrangement of these values.

The operation data collector 221 generates operation data request commands for each piece of facility equipment (outdoor equipment 10, indoor equipment 11A, 11B, . . . ) of the facility equipment control system 1 at each prescribed time (for example, five minutes), and sends the commands to each piece of facility equipment via the equipment communicator 200. Furthermore, when the equipment communicator 200 receives operation data sent from each piece of facility equipment in response to the operation data request command, the operation data collector 221 extracts the equipment address, the type ID and the data value from the operation data. The operation data collector 221 then stores the extracted data and the current date and time in the operation data table 231 stored in the operation data storage 230.

The summary data transmitter 222, upon receiving the summary data request command from the monitoring device 30 via the remote communicator 210, reads the summary data from the operation data storage 230 and transmits response data storing the summary data to the monitoring device 30 via the remote communicator 210. The summary data request command is a command requesting summary data for a type ID corresponding to an equipment address. The data collecting device 20 has saved data (summary data) in which the equipment address and the type ID are associated together, in the operation data storage 230 in advance.

The operation data transmitter 223, upon receiving a collection data request command from the monitoring device 30 via the remote communicator 210, reads the operation data under prescribed conditions from the operation data table 231 of the operation data storage 230 and transmits response data storing the operation data to the monitoring device 30 via the remote communicator 210.

The collection data request command is a command requesting operation data collected by the data collecting device 20. In this collection data request command, the equipment address, the type ID and the collection period are set. The operation data transmitter 223 reads one or multiple items of operation data that are request targets from the operation data table 231 of the operation data storage 230 based on this information set in the collection data request command.

The operation data transmitter 223 generates compressed data by compressing the one or multiple items of operation data read from the operation data table 231 through a prescribed algorithm. Then, the operation data transmitter 223 transmits the response data storing the compressed data to the monitoring device 30.

The monitoring device 30 is a device that connects to multiple data collecting devices 20 via the network 40, acquires operation data collected from each data collecting device 20 to which each facility equipment control system 1 belongs, and presents the operation data to the user (operator).

Figure 4:
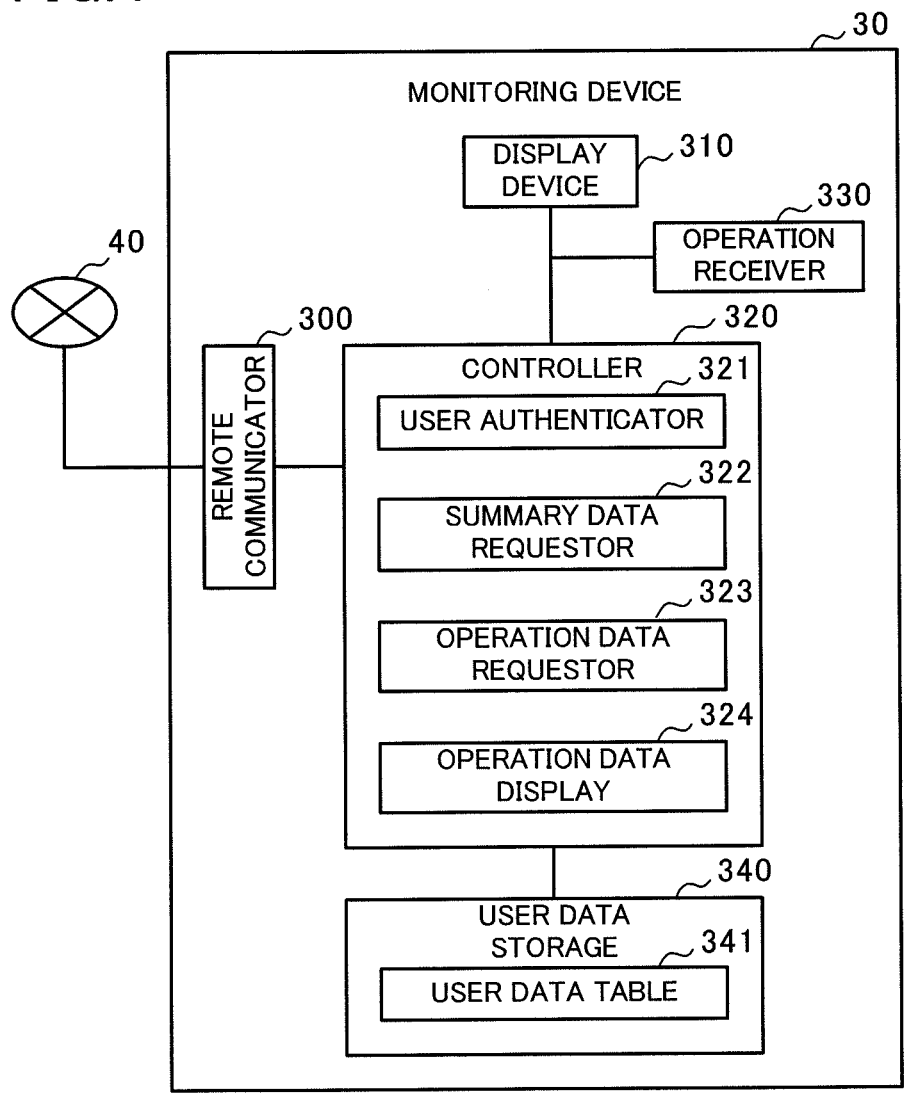
FIG. 4 is a block diagram showing a configuration of a monitoring device.

As shown in FIG. 4, the monitoring device 30 comprises a remote communicator 300, a display device 310, a controller 320, an operation receiver 330 and a user data storage 340.

The remote communicator 300 (second remote communicator) comprises, for example, a communications interface such as a network card, a data communication card and/or the like, and accomplishes data communication with the above-described data collecting devices 20 via the network 40.

The display device 310 is, for example, a display device such as a CRT display, a liquid crystal display and/or the like, and accomplishes displays of the operation data and/or the like sent from the data collecting devices 20 and screens for user operation, under control of the controller 320.

The controller 320 comprises a CPU, a ROM, a RAM and/or the like, although such are not depicted in the drawings. The controller 320 transmits summary data request commands and collection data request commands to the data collecting devices 20 through operation by the user (operator). In addition, the controller 320 analyzes the response data sent from the data collecting devices 20 in response to these commands, and causes the contents thereof (summary data, operation data and/or the like) to be displayed on the display device 310 in a prescribed format. The controller 320 functionally comprises a user authenticator 321, a summary data requestor 322, an operation data requestor 323 and an operation data display 324. Details of these functional components are described below.

The operation receiver 330 comprises, for example, a keyboard, a mouse, keypad, a touchpad, a touch panel and/or the like, and receives input operations from the operator and sends signals in accordance with the received input operations (operation signals) to the controller 320.

The user data storage 340 comprises, for example, a readable and writeable non-volatile semiconductor memory or a hard disk drive and/or the like, and stores a user data table 341 and various other data. As shown in FIG. 5, the user data table 341 is a data table in which multiple records are entered, each record comprising a type ID 3410, a password 3411, a connectable range 3412 and a disclosable range 3413.

The type ID 3410 is an ID indicating the type of operator. In this embodiment, "b01", "b02" and "b03" are assigned to engineer and building manager A and B, respectively. The password is recorded in advance for each type of operator and is used during the below-described operator authentication process. The password, for example, comprises seven characters that are a combination of Roman characters and numbers. The connectable range 3412 is information in which the data collecting devices 20 that are accessible, that is to say with which sending and receiving of data is possible, through operation by the operator are defined. In the connectable range 3412, device IDs ("c01" to "c04") allocated in advance to each of the data collecting devices 20 are set.

In the example in FIG. 5, if the operator is an engineer it is decided that it is possible to send and receive of data with the four data collecting devices 20 of "c01" to "c04." In addition, if the operator is a building manager A, it is indicated that it is possible to send and receive data with the two data collecting devices 20 of "c01" and "c02," and if the operator is a building manager B, it is indicated that it is possible to send and receive data with the two data collecting devices 20 of "c03" and "c04".

The disclosable range 3413 is information in which the types of operation data that can be disclosed to the operator are defined. In the disclosable range 3413, IDs indicating the above-described operation data type are set. In the example in FIG. 5, if the operator is an engineer, it is decided that it is possible to disclose operation data for the seven types of "a01" to "a07" (refrigerant temperature, refrigerant pressure, outdoor temperature, set temperature, indoor temperature, operation mode, valve openness). In addition, if the operator is a building manager A or B, it is indicated that it is possible to disclose operation data for the three types of "a04" to "a06".

Figure 6:
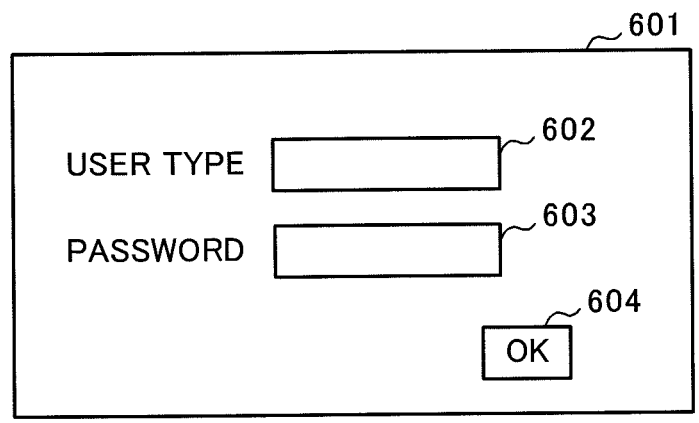
FIG. 6 is a drawing showing an example of a user authentication screen.

The user authenticator 321 accomplishes authentication of the operator using the monitoring device 30. When a prescribed operation for accomplishing monitoring of operation data is accomplished via the operation receiver 330 by an operator, the user authenticator 321 displays a user authentication screen 601 such as the one shown in FIG. 6 via the display device 310. The operator inputs his or her type ID and password into a user type input field 602 and a password input field 603 via the operation receiver 330. In the user type input field 602, it would be fine to specify input of the type name (for example, engineer) instead of the type ID. Or, the type ID or type name could be displayed as a list and the operator could select from this list.

When input is made to the user type input field 602 and the password input field 603 and an OK button 604 is pressed by the operator, the user authenticator 321 references the user data table 341 and determines whether or not the input content (type ID and password) are correct. When the input content is not correct, the user authenticator 321 causes an error message to that effect to be displayed on the display device 310, and again prompts the user for input into the user type input field 602 and the password input field 603.

On the other hand, when the input content is correct, the user authenticator 321 sends notification of the authenticated type ID of the operator to the summary data requestor 322. Upon receiving this notification, the summary data requestor 322 references the user data table 341 and reads the contents of the connectable range 3412 from a record for which the type ID 3410 matches the type ID for which notification was given. The summary data requestor 322 then displays a connection target selection screen 701 such as that shown in FIG. 7 via the display device 310.

Figure 7:
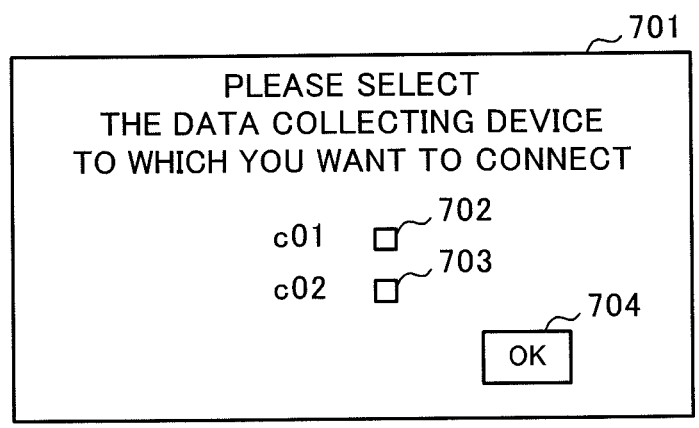
FIG. 7 is a drawing showing an example of a connection target selection screen.

The example in FIG. 7 shows the case where the type of operator is building manager A. The operator can select the data collecting device 20 to which connection is desired by inserting a check in the checkbox 702 or 703 via the operation receiver 330. For example, when the intent is to select the data collecting device 20 having a device ID of "c01," the operator places a check in the checkbox 702. Accordingly, a check mark is displayed in the checkbox 702, as shown in FIG. 8. In place of the device ID, or along with such, it would be fine to display a name or the like (for example, a location where situated and/or the like) that specifies each of the data collecting devices 20. In this way, the operator can select the desired data collecting device 20 without knowing the correlation between the device ID and the data collecting device 20.

When an OK button 704 is pressed by the operator, the summary data requestor 322 determines whether or not a check has been placed in at least one of the checkboxes 702 and 703. When no mark has been made in either checkbox, the summary data requestor 322 causes an error message to that effect to be displayed on the display device 310 and again prompts the operator to check a checkbox.

On the other hand, when a check has been made in at least one of the checkboxes 702 and 703, the summary data requestor 322 sends a summary data request command to the remote communicator 300 for the data collecting device 20 corresponding to the checkbox in which a check has been placed.

Following this, when response data corresponding to the summary data request command is sent from the data collecting device 20, the summary data requestor 322 extracts summary data from the response data. As described above, this summary data is data indicating the correlation between the equipment address and the type ID indicating the type of operation data, in the data collecting device 20. The summary data requestor 322 references the user data table 341, reads the contents of the disclosable range 3413 from the record corresponding to the type of operator, and acquires operation data the operator can select (hereafter called operation data acquisition candidates) based on the contents of the disclosable range 3413 and the summary data.

For example, when the content of the summary data is as shown in FIG. 9 and the operator is a building manager A, the operation data acquisition candidates acquired by the summary data requestor 322 is as shown in FIG. 10.

The summary data requestor 322 supplies the acquired operation data acquisition candidates to the operation data requestor 323. The operation data requestor 323 generates an operation data selection screen 1101 like that shown in FIG. 11 based on the operation data acquisition candidates supplied by the summary data requestor 322, and displays this screen via the display device 310.

In the operation data selection screen 1101 of FIG. 11, checkboxes 1102 and 1103 are used for selecting the facility equipment for which the operator desires to acquire operation data. The checkbox 1102 corresponds to the facility equipment at equipment address "51*h*" and the checkbox 1103 corresponds to the facility equipment at equipment address "52*h*". In addition, checkboxes 1104-1109 are used for selecting the type of operation data the operator desires to acquire. The checkboxes 1104-1106 correspond to the facility equipment at the equipment address "51*h*", and the checkboxes 1107-1109 correspond to the facility equipment at the equipment address "52*h*".

A starting date/time input field 1110 and an ending date/time input field 1111 are used for the user to specify the collection period of the operation data. Collection period here means a period in which operation data desired by the user is acquired in the data collecting device 20.

In place of, or along with, the equipment address, it would be fine to display a name for the facility equipment (for example, "indoor equipment A" or the like). Similarly, in place of, or along with, the type ID of the operation data, it would be fine to display a type name for the operation data (for example, "set temperature" or the like). In addition, the collection period of the operation data may be designated for each facility equipment or may be designated for each type of operation data.

When an OK button 1112 is pressed by the operator, the operation data requestor 323 determines whether or not correct input has been done by the operator. For example, when a check is placed in neither the checkbox 1102 nor the checkbox 1103, the operation data requestor 323 causes an error message to this effect to be displayed on the display device 310 and again prompts the operator for an input operation.

Additionally, for example when a check has been placed in the checkbox 1102 (1103) but no check is placed in any of the corresponding checkboxes 1104-1106 (1107-1109) for operation data type, an input error results. In addition, when no input has been made in at least one out of the starting date/time input field 1110 or the ending date/time input field 1111, or when there is a writing error, or when the ending date/time is before the starting date/time, an input error results.

On the other hand, when correct input has been accomplished by the operator as in the example shown in FIG. 12, the operation data requestor 323 generates a collection data request command based on the input contents and transmits this command to the corresponding data collecting devices 20 via the remote communicator 300.

Following this, when response data corresponding to the collection data request command is sent from the data collecting devices 20, the operation data display 324 extracts the above-described compressed data from the response data. The operation data display 324 then decompresses this compressed data and restores one or multiple items of operation data. The operation data display 324 displays the contents of the restored operation data via the display device 310. Through this, it is possible for the operator to visually confirm the desired operation data.

Figure 13:
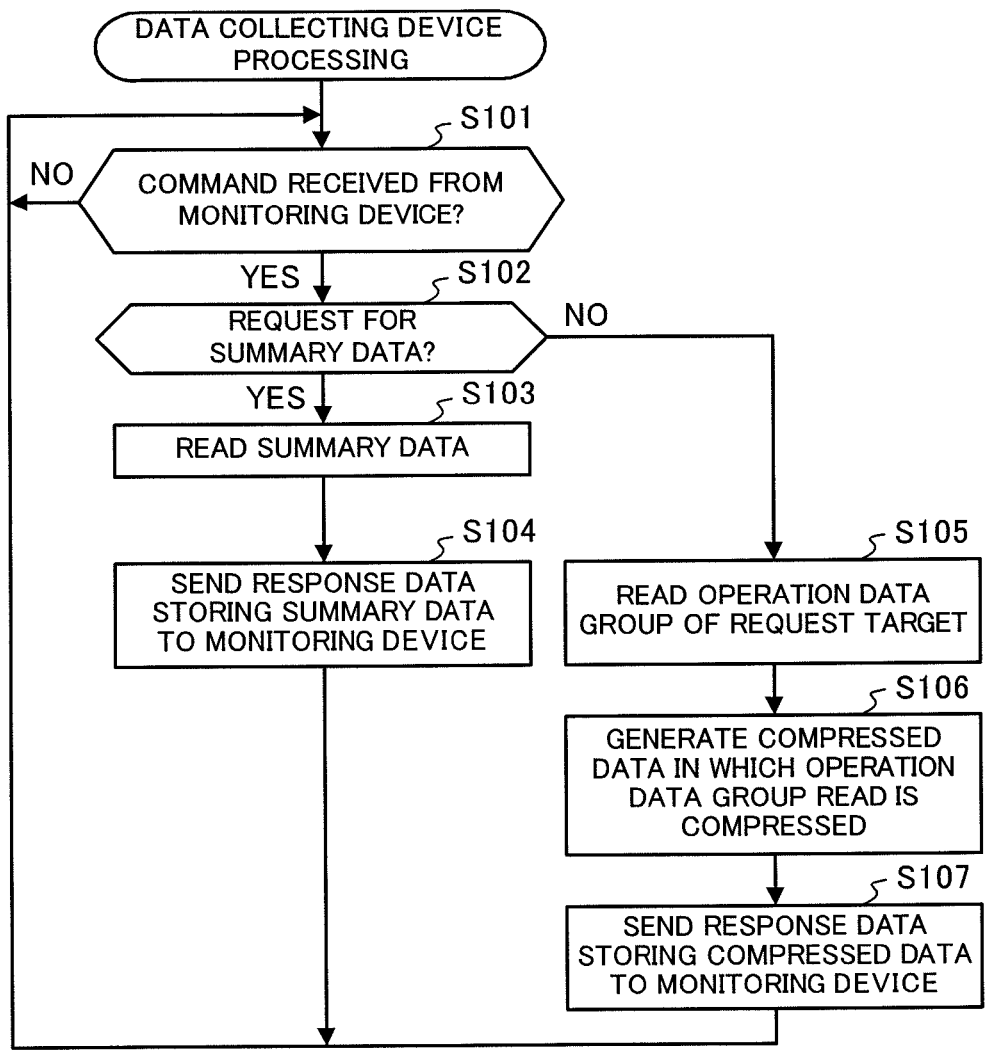
FIG. 13 is a flowchart showing a processing procedure of the data collecting device; and, FIG. 14 is a flowchart showing a processing procedure of the monitoring device.

FIG. 13 is a flowchart showing the flow of a monitoring-related processing for the operation data executed by a data collecting device 20 having the above-described configuration. The below processing is repeatedly executed while the power source of the data collecting device 20 is on.

When the remote communicator 210 receives a command from the monitoring device 30 (step S101: YES) and the command is a summary data request command (step S102: YES), the summary data transmitter 222 reads summary data from the operation data storage 230 (step S103). The summary data transmitter 222 then generates response data stored in the summary data that was read, and transmits this response data to the monitoring device 30 via the remote communicator 210 (step S104).

On the other hand, when the command received is a collection data request command (step S102: NO), the operation data transmitter 223 reads one or multiple items of operation data (operation data groups) that are request targets from the operation data table 231 of the operation data storage 230, based on the information (equipment address, operation data type ID, collection period) set in the collection data request command (step S105).

The operation data transmitter 223 generates compressed data consisting of the operation data groups that were read compressed by a prescribed algorithm (step S106). Below, one example of a compression algorithm that can be utilized in the present invention is shown. In this example, the operation data groups that were read are first grouped by equipment address and type ID. In addition, the data values of each item of operation data in each group are arranged chronologically based on the acquisition time. The data values of a given item of operation data of a given group arranged chronologically are called $x[t]$ ($t=1, 2, 3, \ldots$). Furthermore, $y[t]$ is found as shown below for this $x[t]$.

$$y[1]=x[1],$$

$$y[2]=x[2]-x[1],$$

$$y[3]=x[3]-x[2],$$

Furthermore, the $y[t]$ when t is a maximum value (that is to say, the acquisition count of the operation data) becomes the post-compression data. Accordingly, here compressed data is generated for each item of operation data in each group.

The above-described compression algorithm is effective when the operation data is, for example, the indoor temperature in the indoor equipment. With this compression algorithm, the conditions for effectiveness are restricted when $|y[t]|<|x[t]|$ is established. However, for example when the data collecting device 20 collects operation data every five minutes, there is a high probability that the amount of change in the indoor temperature in five minutes is a small value compared to the original data value. That is, the probability that the above condition is established is high.

In addition, a general-purpose data compression algorithm can naturally be utilized. For example, operation data grouped by type ID can be taken as two-dimensional numerical data with equipment address and acquisition time along the respective axes. Accordingly, it would be fine to adopt a reversible compression algorithm such as a method of run-length compression in which when the same value is continuous, only the number of times continuing with that value remains.

The operation data transmitter 223 transmits to the monitoring device 30 the response data that stores the compressed data generated as described above (step S107).

Figure 14:
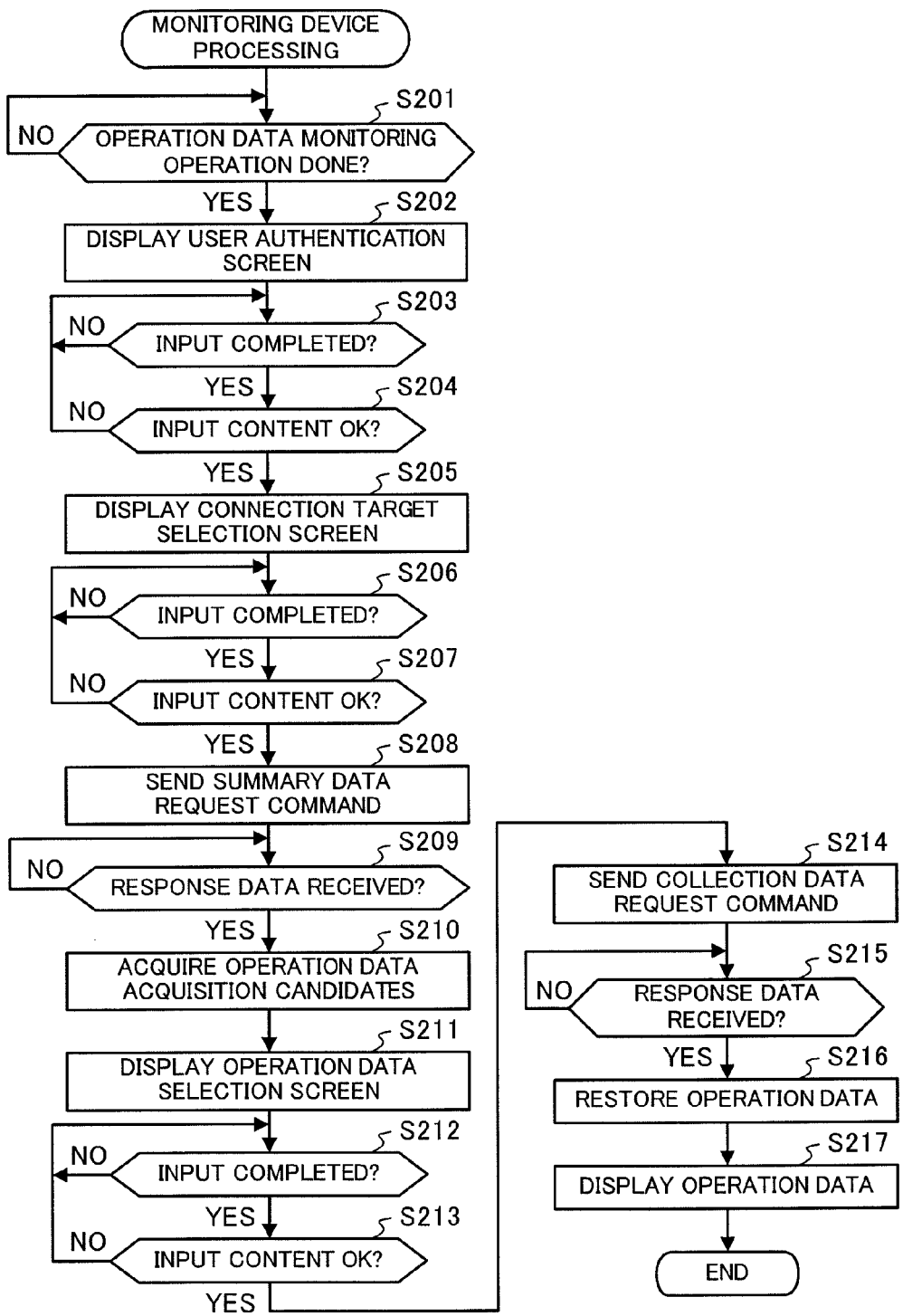

Next, a monitoring-related processing for the operation data executed by the monitoring device 30 having the above configuration are described with reference to the flowchart in FIG. 14.

When a prescribed operation for monitoring operation data is accomplished by the operator (step S201: YES), the user authenticator 321 displays a user authentication screen 601 like that shown in FIG. 6 via the display device 310 (step S202).

When an input completion operation is accomplished by the operator (step S203: YES), that is to say when the OK button 604 of the user authentication screen 601 is pressed, the user authenticator 321 checks the input content. As a result, when the user's input content is not correct (step S204: NO), the user authenticator 321 causes an error message to that effect to be displayed on the display device 310 and again prompts the operator for an input operation.

On the other hand, when the input content is correct (step S204: YES), the summary data requestor 322 generates the connection target selection screen 701 (see FIG. 7) and displays this screen via the display device 310 (step S205).

When an input completion operation is accomplished by the operator (step S206: YES), that is to say when the OK button 704 of the connection target selection screen 701 is pressed, the summary data requestor 322 checks the input content. As a result, when the user's input content is not correct (step S207: NO), the summary data requestor 322 causes an error message to this effect to be displayed on the display device 310 and again prompts the operator for an input operation.

On the other hand, when the input content is correct (step S207: YES), the summary data requestor 322 transmits the summary data request command to the data collecting devices 20 via the remote communicator 300 (step S208).

When response data from the data collecting devices 20 in response to the summary data request command is received (step S209: YES), the summary data requestor 322 acquires operation data acquisition candidates based on the summary data extracted from the response data and the contents of the disclosable range 3413 corresponding to the type of operator in the user data table 341 (step S210).

The operation data requestor 323 generates the operation data selection screen 1101 (see FIG. 11) based on the operation data acquisition candidate acquired from the summary data requestor 322, and displays this screen via the display device 310 (step S211).

When an input completion operation is accomplished by the operator (step S212: YES), that is to say when the OK button 1112 on the operation data selection screen 1101 is pressed, the operation data requestor 323 checks the input content. As a result, when the user's input content is not correct (step S213: NO), the operation data requestor 323 causes an error message to that effect to be displayed on the display device 310 and again prompts the operator for an input operation.

On the other hand, when the input content is correct (step S213: Yes), the operation data requestor 323 transmits the collection data request command to the data collecting devices 20 via the remote communicator 300 (step S214).

When response data from the data collecting devices 20 in response to the collection data request command is received (step S215: YES), the operation data display 324 decompresses the compressed data extracted from the response data and restores one or multiple items of operation data (step S216). Then the operation data display 324 displays the contents of the restored operation data via the display device 310 (step S217).

As described in detail above, with the remote monitoring system 2 according to this embodiment, when monitoring of operation data is accomplished, only operation data selected by the user from among operation data accumulated and stored in the data collecting devices 20 is acquired and transmitted to the monitoring device 30. Consequently, communication volume is reduced.

In addition, because the operation data is compressed and transmitted, communication volume is further reduced.

In addition, it is possible to compile operation data in a collection period designated by the user and transmit this data from the data collecting devices 20 to the monitoring device 30. Consequently, it is possible to reduce the communication connection time between the data collecting devices 20 and the monitoring device 30. In addition, it is possible to reference operation data from a desired past date and time, so operation statuses that are difficult to track in real time, such as late-night operation statuses and operation abnormalities that occur with extremely low frequency, can be confirmed and response operations can be implemented.

In addition, as noted above, it is possible to reduce the communication volume and connection time between the data collecting devices 20 and the monitoring devices 30, so for example even when it is necessary to use a communication service that employs a pay-as-you-go fee system, it is possible to pull in communication fees.

In addition, the monitoring device 30 can restrict the data collecting devices 20 that are accessible, that is to say from which operation data can be acquired, in accordance with the type of user. Consequently, for example it is possible to make it so that the manager of a given floor in a building can only confirm operation data for the facility equipment control system 1 set up on that floor, while the manager of the building as a whole and engineers with responsibility for maintenance can confirm operation data for all facility equipment control systems 1 set up in the building. By enabling such operation, it is not necessary to prepare a dedicated monitoring system 30 for each user, thereby pulling in operating costs.

Furthermore, it is possible to restrict the disclosure range of the operation data in accordance with the type of user, so confidentiality is enhanced and prevention of erroneous operation can also be anticipated.

The present invention is not limited to the above-described embodiment, for various variations are naturally possible without deviating from the scope of the present invention.

For example, when requesting transmission of summary data to the data collecting devices 20 from the monitoring device 30, it would be fine to designate a disclosure range for operation data corresponding to the operator. By doing so, the data collecting devices 20 need not include the type ID of operation data that cannot be disclosed to the user in the summary data transmitted, thereby reducing data volume.

Furthermore, it would be fine to have a specification in which transmission of the summary data is not accomplished to the monitoring device 30 from the data collecting devices 20. In this case, it would be fine for the monitoring device 30 to retain in advance summary data for each data collecting device 20. By doing so, communication in accordance with the summary data request and transmission need not be accomplished, so it is possible to further reduce the connection time between the data collecting devices 20 and the monitoring device 30.

Various embodiments and modifications are available to the present invention without departing from the broad sense of spirit and scope of the present invention. The above-described embodiment is given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

INDUSTRIAL APPLICABILITY

The present invention is suitably applied to various technology for remotely monitoring the operation status of various types of facility equipment constituting a facility equipment control system.

REFERENCE SIGNS LIST

1 Facility equipment control system
10 Outdoor equipment
11 Indoor equipment
12 Remote control
2 Remote monitoring system
20 Data collecting device
200 Equipment communicator
210 Remote communicator
220 Controller
221 Operation data collector
222 Summary data transmitter
223 Operation data transmitter
230 Operation data storage
231 Operation data table
30 Monitoring device
300 Remote communicator
310 Display device
320 Controller
321 User authenticator
322 Summary data requestor
323 Operation data requestor
324 Operation data storage
330 Operation receiver
340 User data storage
341 User data table
40 Network

The invention claimed is:

1. A remote monitoring system comprising a data collecting device and a monitoring device, wherein:
the data collecting device comprises:
an equipment communicator that accomplishes data communication with facility equipment that constitutes a facility equipment control system;
a first remote communicator that accomplishes data communication with the monitoring device;
an operation data collector that collects operation data indicating the operation status of the facility equipment, the operation data being numerical data;
an operation data storage that stores the operation data collected by the operation data collector; and
an operation data transmitter that groups multiple items of operation data read from the operation data storage according to an ID of the facility equipment and a type of the operation data, extracts a difference in the operation data in a chronological manner for each group to thereby generate compressed data, and transmits the generated compressed data to the monitoring device; and
the monitoring device comprises:
a second remote communicator that accomplishes data communication with the data collecting device;
an operation receiver that receives operation input from a user;
a user data storage that stores a user data table in which types of operation data disclosable to each user are defined;
an operation data requestor that, when operation input that requests monitoring of operation data is accomplished by the user, acquires types of operation data selectable by the user based on the user data table, and causes the user to select a desired type of operation data from the acquired types of operation data; and
an operation data display that decompresses the compressed data received from the data collecting device, restores one or multiple items of operation data, and displays contents of the restored one or multiple items of operation data on a display device.

2. The remote monitoring system according to claim 1, wherein the operation data requestor of the monitoring device further causes the user to select a prescribed collection period for the desired type of operation data, generates a collection data request command designating the selected type of operation data and the selected collection period, and transmits the generated collection data request command to the data collecting device, and
upon receiving the collection data request command transmitted from the monitoring device, the operation data transmitter of the data collecting device transmits to the monitoring device the operation data read from the operation data storage in accordance with contents of the collection data request command.

3. The remote monitoring system according to claim 2, wherein
there are multiple data collecting devices and each responds to a different facility equipment control system;
in the monitoring device,
data collecting devices accessible to each user are further defined in the user data table; and
upon an operation input that requests monitoring of operation data being accomplished by a user, the operation data requestor does not transmit the collection data request command to data collecting devices not accessible by the user.

4. A data collecting device comprising:
an equipment communicator that accomplishes data communication with facility equipment that constitutes a facility equipment control system;
a remote communicator that accomplishes data communication with the monitoring device;
an operation data collector that collects operation data indicating the operation status of the facility equipment, the operation data being numerical data;
an operation data storage that stores the operation data collected by the operation data collector; and
an operation data transmitter that groups multiple items of operation data read from the operation data storage according to an ID of the facility equipment and a type of the operation data, extracts a difference in the operation data in a chronological manner for each group to thereby generate compressed data, and transmits the generated compressed data to the monitoring device.

5. A monitoring device, comprising:
a remote communicator that accomplishes data communication with a data collecting device that collects operation data indicating the operation status of facility equipment that constitutes a facility equipment control system, the operation data being numerical data;
an operation receiver that receives operation input from a user;
a user data storage that stores a user data table in which types of operation data disclosable to each user are defined;
an operation data requestor that, when operation input that requests monitoring of operation data is accomplished by the user, acquires types of operation data selectable by the user based on the user data table, and causes the user to select a desired type of operation data from the acquired types of operation data; and
an operation data display that decompresses compressed data received from the data collecting device, restores one or multiple items of operation data, and displays contents of the restored one or multiple items of operation data on a display device, the compressed data being generated by grouping multiple items of operation data according to an ID of the facility equipment and a type of the operation data and by extracting a difference in the operation data in a chronological manner for each group.

6. A remote monitoring method comprising:
collecting, by a data collecting device, operation data indicating the operation status of facility equipment, the operation data being numerical data;
upon an operation input that requests monitoring of operation data being accomplished by a user, acquiring, by a monitoring device, types of operation data selectable by the user based on a user data table in which types of operation data disclosable to each user are defined, and causing the user to select a desired type of operation data from the acquired types of operation data;
grouping, by the data collecting device, multiple items of operation data read from the operation data storage for storing the operation data collected from the facility equipment, according to an ID of the facility equipment and a type of the operation data, extracting a difference in the operation data in a chronological manner for each group to thereby generate compressed data, and transmitting the generated compressed data to the monitoring device; and
decompressing, by the monitoring device, the compressed data received from the data collecting device, restoring one or multiple items of operation data, and displaying contents of the restored one or multiple items of operation data on a display device.

7. A non-transitory computer-readable recording medium having stored thereof a program that causes a computer to function as:
an operation data collector that collects operation data indicating the operation status of facility equipment, the operation data being numerical data; and
an operation data transmitter that groups multiple items of operation data read from an operation data storage for storing the operation data collected from the facility equipment, according to an ID of the facility equipment and a type of the operation data, extracts a difference in the operation data in a chronological manner for each group to thereby generate compressed data, and transmits the generated compressed data to the monitoring device.

8. A non-transitory computer-readable recording medium having stored thereof a program that causes a computer to function as:
an operation data requestor that acquires, when operation input that requests monitoring of operation data indicating the operation status of facility equipment is accomplished by a user, types of operation data selectable by the user based on a user data table in which types of operation data disclosable to each user are defined, and causes the user to select a desired type of operation data from the acquired types of the operation data; and
an operation data display that decompresses compressed data received from a data collecting device, restores one or multiple items of operation data, and displays contents of the restored one or multiple items of operation data on a display device, the compressed data being generated by grouping multiple items of operation data according to an ID of the facility equipment and a type of the operation data and by extracting a difference in the operation data in a chronological manner for each group.

\* \* \* \* \*